Dec. 29, 1970  C. H. DAVIS  3,550,249
STRIP CUTTING AND JOINING APPARATUS
Filed May 14, 1968  7 Sheets-Sheet 7

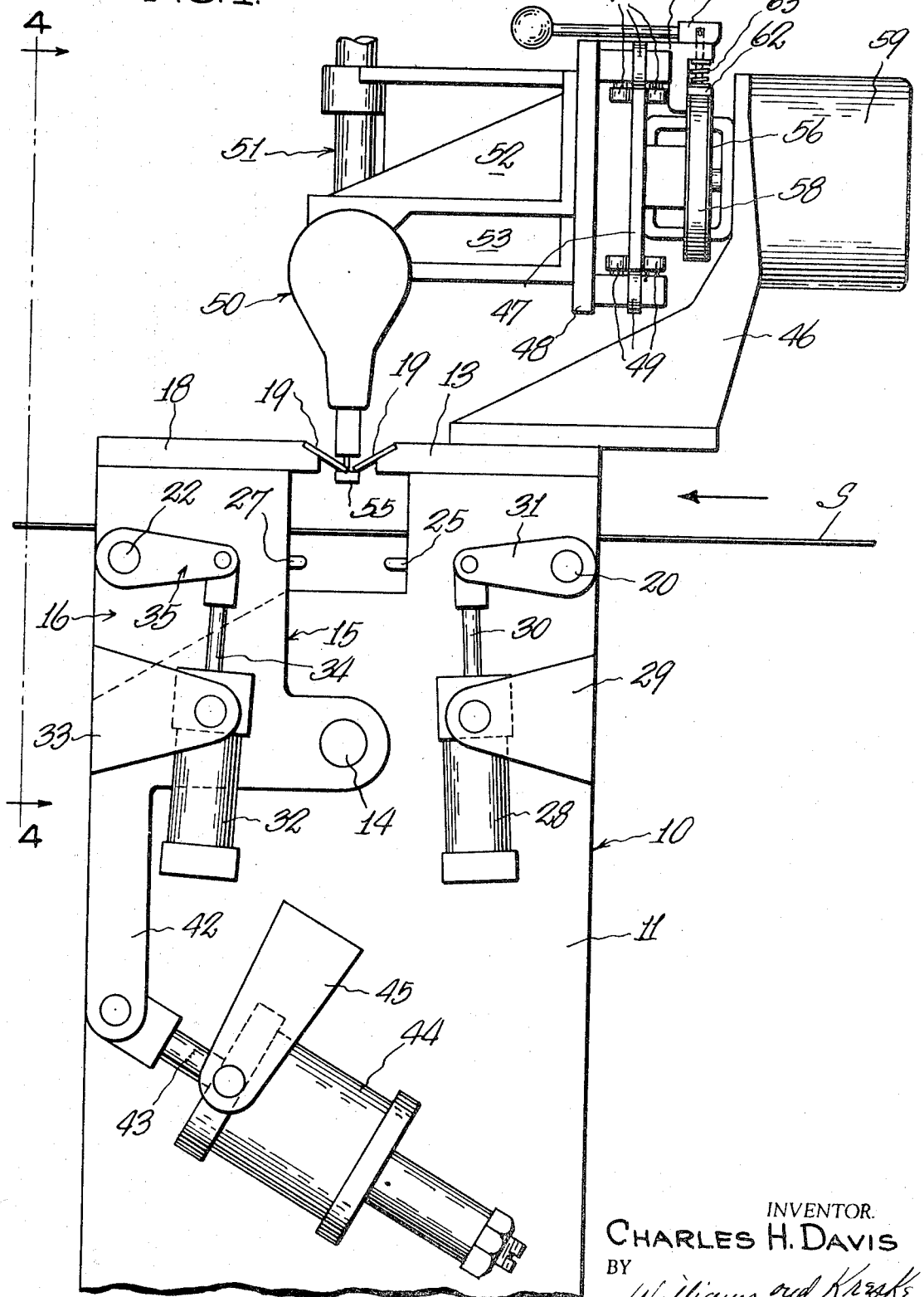

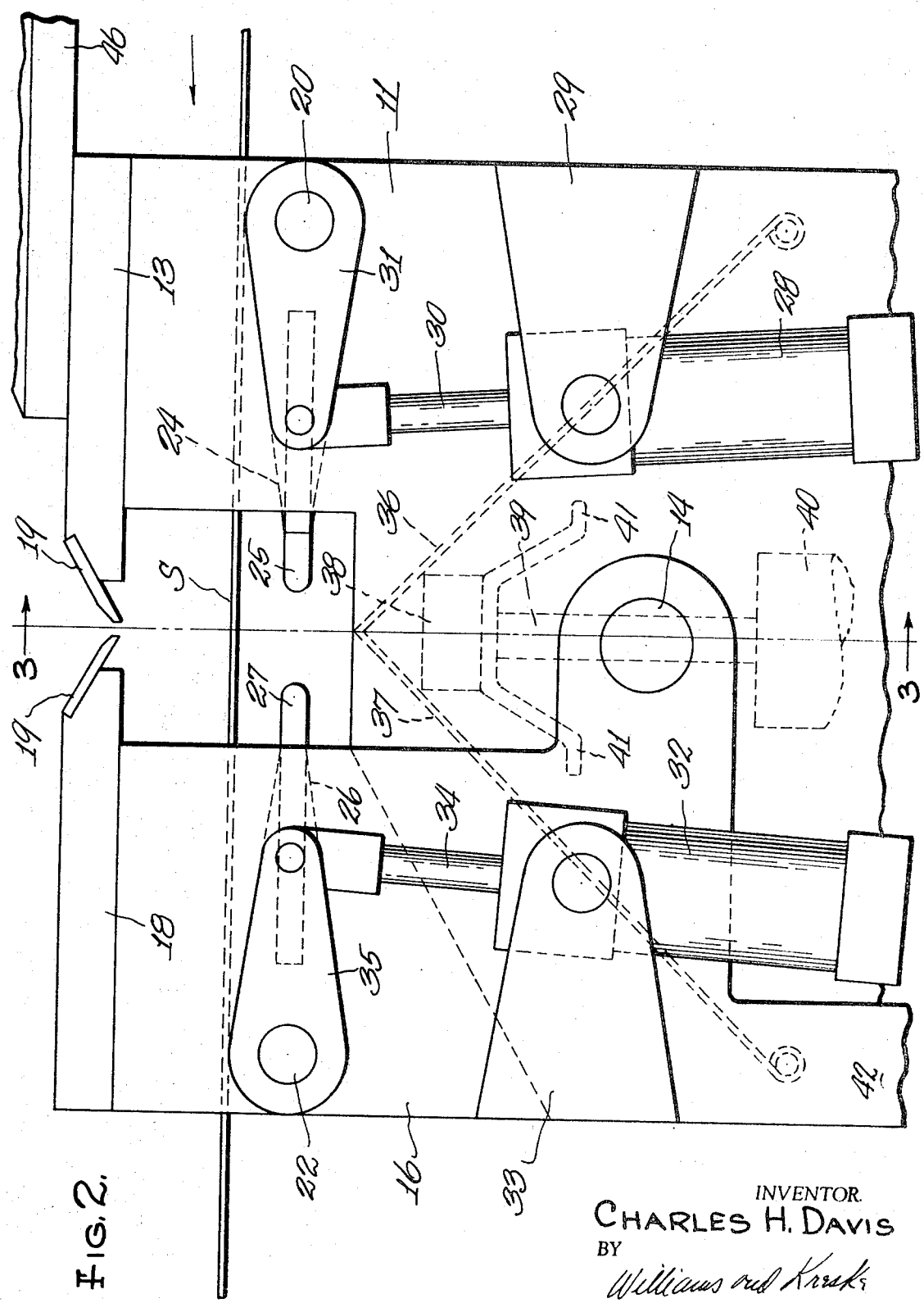

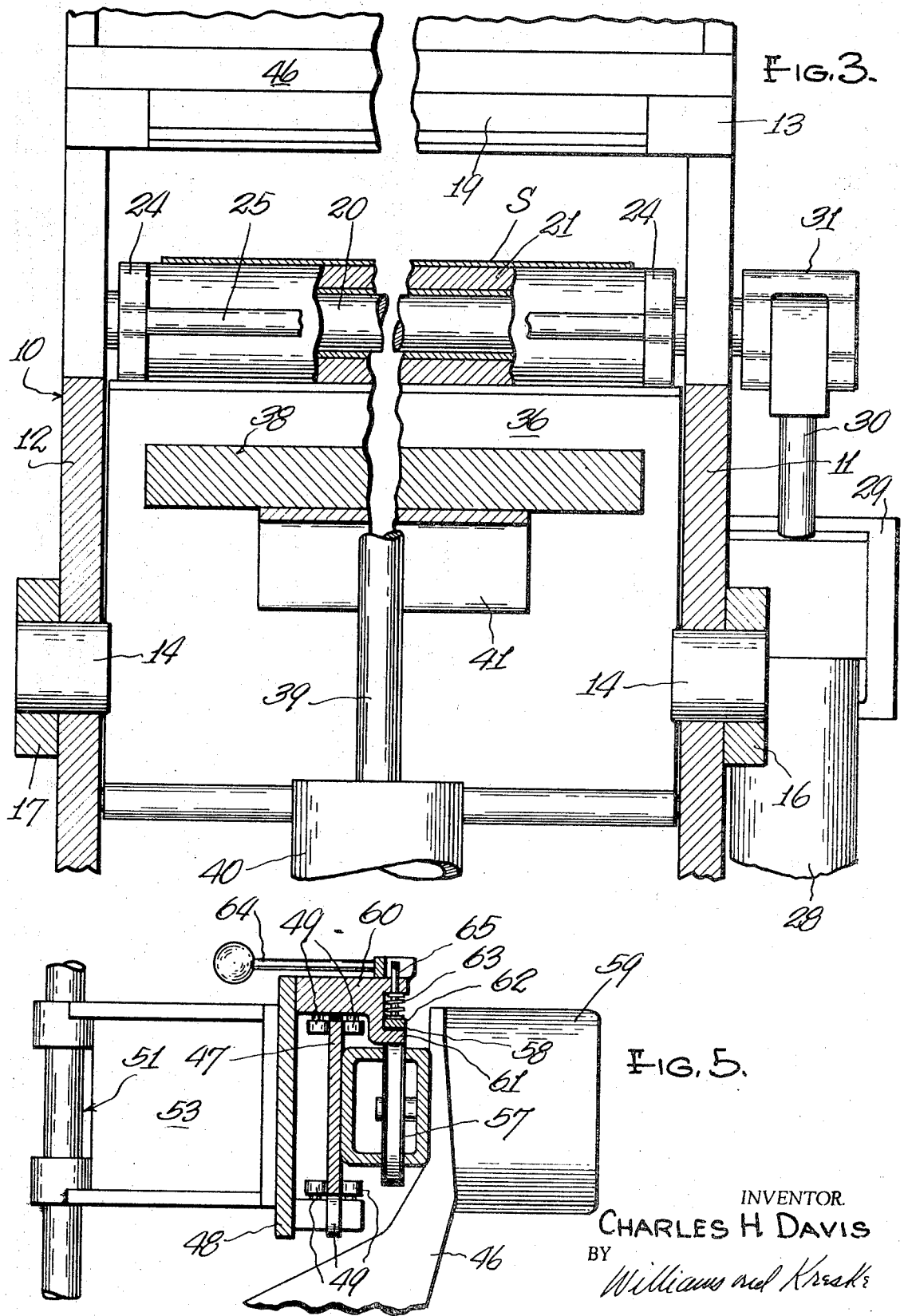

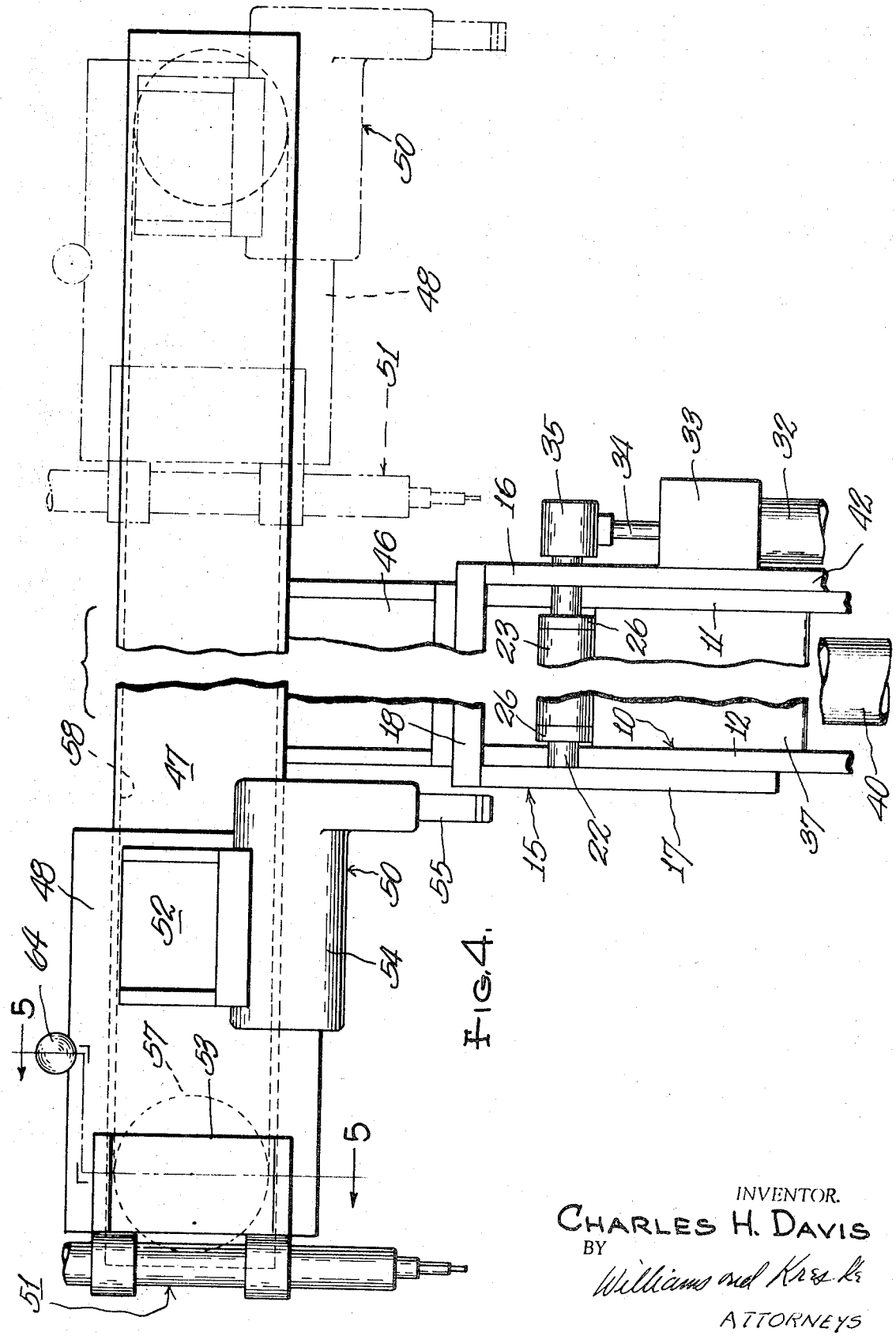

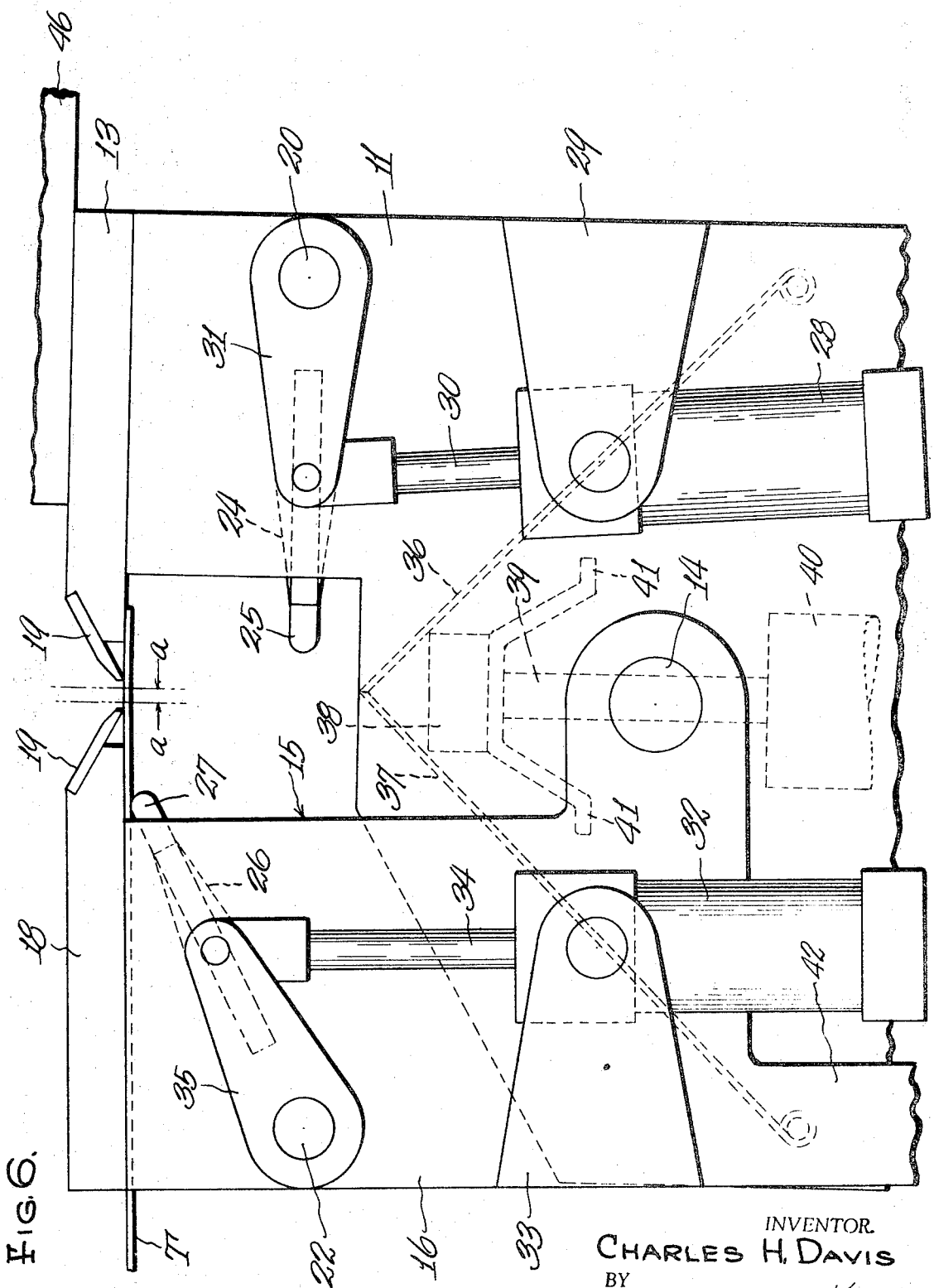

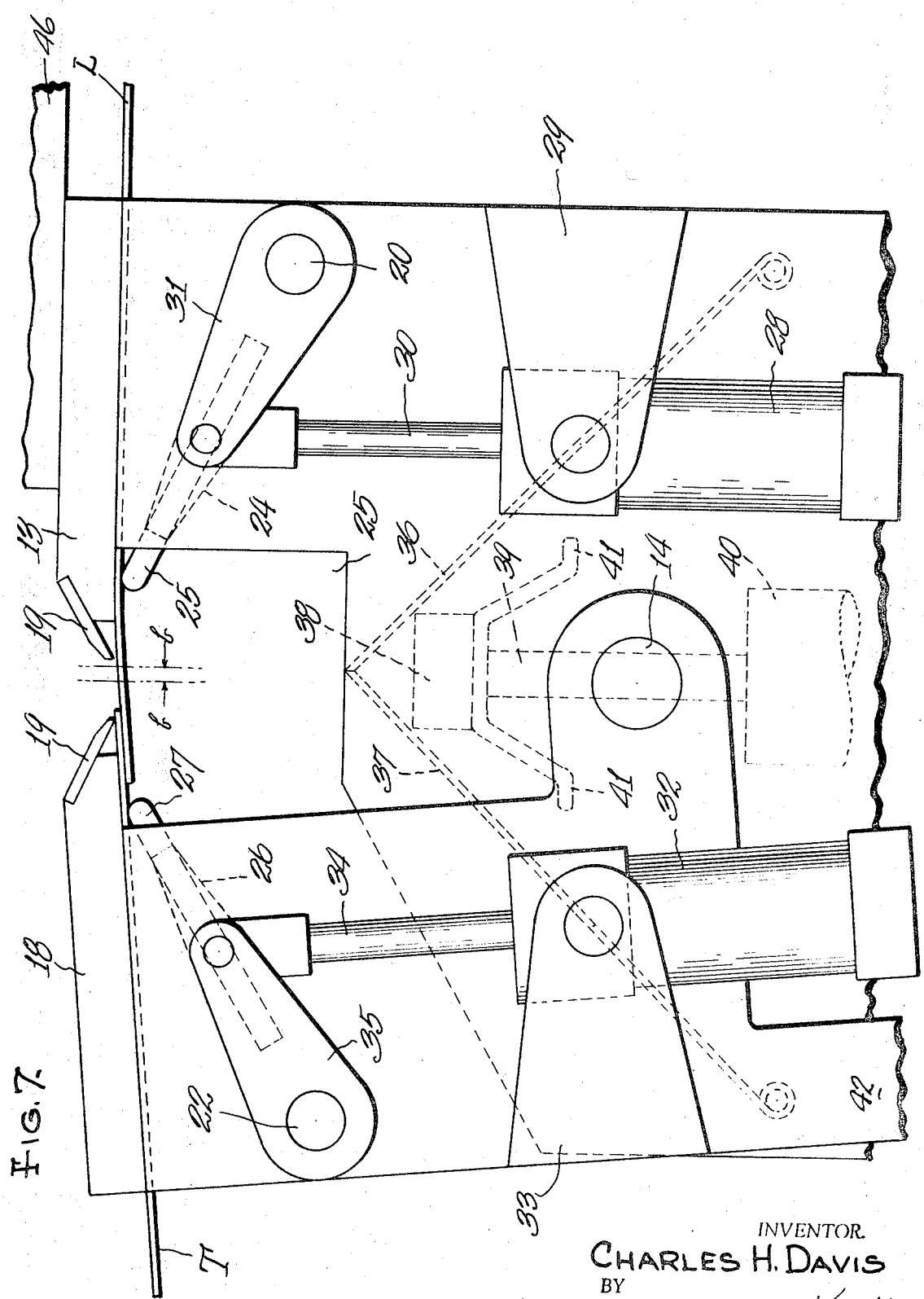

INVENTOR
CHARLES H. DAVIS
BY
Williams and Kreske
ATTORNEY

United States Patent Office 3,550,249
Patented Dec. 29, 1970

3,550,249
STRIP CUTTING AND JOINING APPARATUS
Charles H. Davis, Danville, Ill., assignor to The McKay Machine Company, Youngstown, Ohio
Filed May 14, 1968, Ser. No. 728,991
Int. Cl. B23k 37/04
U.S. Cl. 29—428          14 Claims

ABSTRACT OF THE DISCLOSURE

Method and apparatus for transversely severing and joining sheet-like material, such as metal strip, by clamping the material in position, severing the material with a self-contained cutting device of the type which removes small sections in rapid succession from the material, disposing the severed edges of the material to be joined in juxtaposition, and traversing the juxtapositioned material edges with a welding device which effects progressive joinder thereof.

---

The present invention relates to methods of and apparatus for transversely severing and joining sheet-like material, such as metal strip, and the principal object of this invention is to provide new and improved methods and apparatus of the character described.

Many methods and much apparatus has heretofore been devised for joining metal strip ends together in end-to-end relation. While some prior art methods and some prior art machines have achieved wide usage, such usage has generally been limited to operations which warrant the very high cost of machines of the prior art type.

The present invention makes no pretense of supplanting all prior art inventions in this field; however, the present invention, because of its relatively low cost, will open markets previously closed because of the high cost of prior art machines. The advantages of the invention will readily become apparent from a study of the following description and from the appended drawings.

In the drawings accompanying this specification and forming a part of this application there is shown, for purpose of illustration, an embodiment which the invention may assume, and in these drawings:

FIG. 1 is a side elevational view of apparatus embodying the present invention,

FIG. 2 is a fragmentary view similar to FIG. 1 but to a larger scale,

Figure 8:
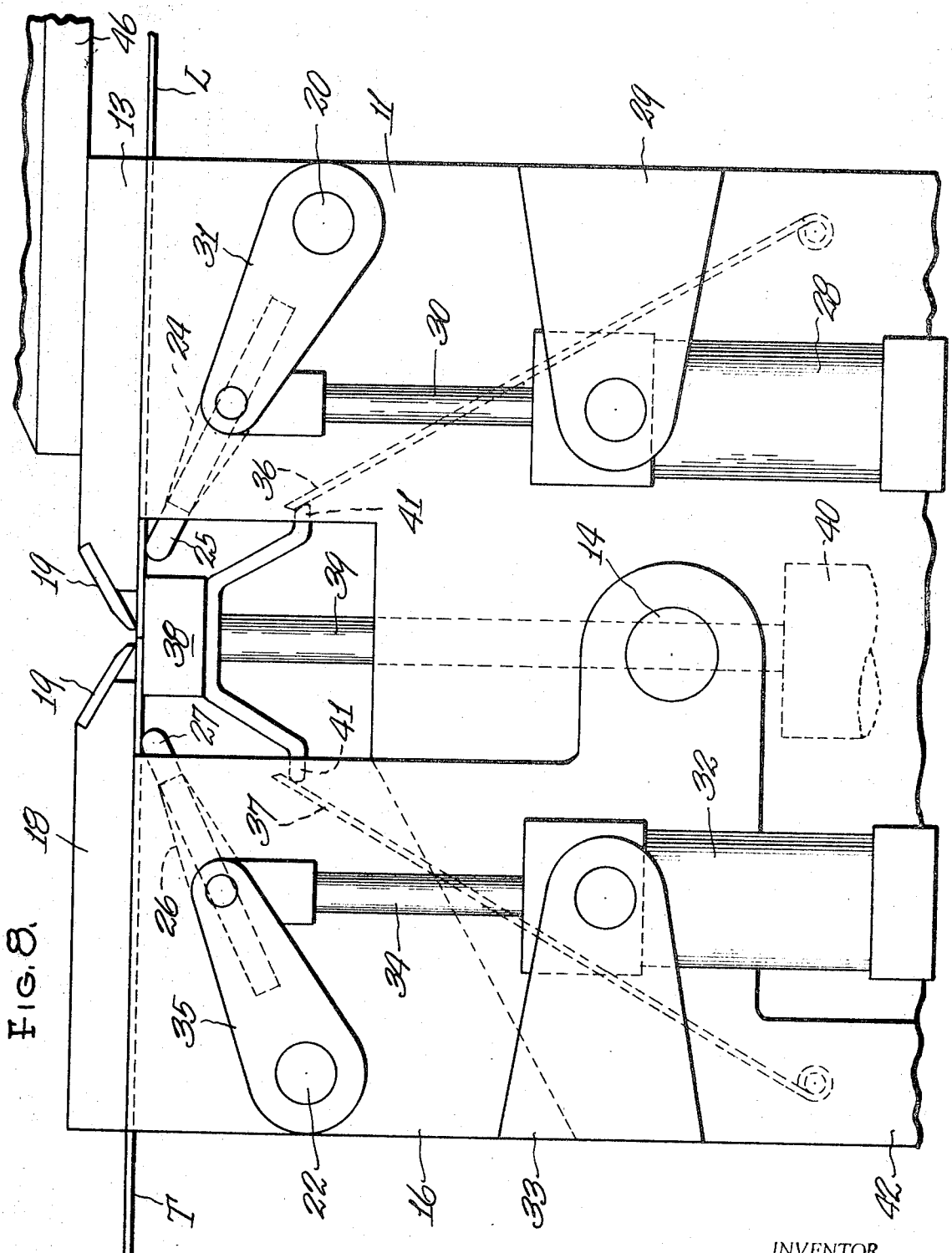

FIG. 3 is a broken, fragmentary sectional view generally corresponding to the line 3—3 of FIG. 2, FIG. 4 is a broken, fragmentary end elevational view generally corresponding to the line 4—4 of FIG. 1, FIG. 5 is a fragmentary sectional view generally corresponding to the line 5—5 of FIG. 4, and FIGS. 6, 7 and 8 are views similar to FIG. 2 but during different stages of operation.

SUMMARY

In brief, the present invention provides clamps disposed on opposite sides of the line of strip juncture for gripping respective strip ends to be joined. A carriage is reciprocable transversely of the clamped strip ends and mounts a self-contained cutting device, known as a nibbler, which functions by severing small sections in rapid succession from the material being cut. Since the cutting device is self-contained, all of the stresses induced by the cutting operation are absorbed therein and thus the heavy supporting structure of prior art apparatus is obviated. Moreover, since but small sections of material are severed at a time, the cutting device is relatively small and light thus further reducing the need for heavy supporting structure.

Means are provided for driving the carriage and the supported cutting device from edge-to-edge of the strip being cut and, to provide for interruption of carriage movement for short successive periods during which the cutting device severs, a small section from the strip, a lost-motion connection is provided. Since the cutting device severs the strip end along respective lines spaced from each other longitudinally of the strip, one of the clamps is movable toward the other to disposed the severed strip ends in juxtaposition so that they can be welded. Finally, the carriage hereinabove mentioned mounts a welding device for progressively joining the juxtaposed strip ends together as the carriage is moved across the strip.

DETAILED DESCRIPTION

With reference to FIGS. 1, 2 and 3, the apparatus illustrating the present invention comprises a frame 10 formed of spaced side walls 11 and 12 disposed on opposite sides of the path of travel of strip S and a top wall 13 overlying the strip. Pivoted to the side walls of frame 10 at 14 is a sub frame 15 similarly formed of spaced side walls 16, 17 and a top wall 18. Top walls 13, 18 are spaced-apart longitudinally of the strip S and at their confronting portions are provided with inclined plates 19 for a purpose to appear.

Extending between the side walls 11, 12 of frame 10 is a shaft 20 and a roller 21 (FIG. 3) is journalled thereon between the side walls for supporting the overlying strip S. In a similar manner, sub frame 15 mounts a shaft 22 on which is similarly journalled a roller 23 (see FIG. 4). As best seen in FIGS. 2 and 3, arms 24 are affixed to the shaft 20 adjacent respective housing side walls and, extending between such arms, is a blade 25 whose function will later appear. Turning now to shaft 22 and as best seen in FIGS. 2 and 4, such shaft mounts arms 26, similar to arms 24, and extending between arms 26 is a blade 27 similar to blade 25.

Means are provided for rocking the shaft 20 and as best seen in FIGS. 2 and 3, a fluid cylinder 28 is pivotally mounted in a bracket 29 secured to the frame side wall 11. Cylinder 28 has a piston rod 30 pivotally secured to the free end of a lever 31 affixed to the shaft 20. In a similar manner; a fluid cylinder 32 is pivotally mounted in a bracket 33 (see FIGS. 2 and 4) secured to the sub frame side wall 16 and such cylinder has a piston rod 34 pivotally secured to the free end of a lever 35 affixed to the shaft 22.

For a purpose to appear and as best seen in FIGS. 2 and 3, deflector plates 36, 37 extend between the frame side walls 11, 12 and are normally disposed in inclined relation as seen in FIG. 2 with their free ends in abutment beneath the gap between the housing top walls 13, 18. Disposed between the plates 36, 37 and beneath the gap aforesaid is a weld backup bar 38 mounted on the piston rod 39 of a vertically disposed fluid cylinder 40. Depending from the bar 38 and inclined toward respective plates 36, 37 are ears 41 whose function will later appear.

As best seen in FIG. 1 and for rocking sub frame 15 about its pivot 14 for a purpose to be disclosed, side wall 16 of the sub frame has a depending extension 42 to which is pivotally secured the piston rod 43 of a fluid cylinder 44. Cylinder 44 is pivotally mounted on the frame side wall 11 by means of a suitable bracket 45. As will later appear, the construction thus far disclosed constitutes clamping and positioning structure for the strip ends to be joined and, a mounting base for strip severing and strip joining apparatus next to be described.

With reference to FIGS. 1 and 4, a bracket 46 is secured to the frame top plate 13 and supports an elongated guide plate 47 which extends transversely of the strip. Movable along the guide plate 47 is a carriage 48 mounting rollers 49 which engage the plate and promote smooth, low-friction movement of the carriage therealong.

Mounted on the carriage 48 in alignment with the gap between the frame tops 13, 18 is a self-contained cutting device 50 and a welder head 51. In the position of parts seen in FIG. 4, cutting device 50 is mounted on the right side of carriage 48 by a bracket 52 while head 51 is mounted on the left side of the carriage by a bracket 53. The arrangement is such that as the carriage traverses the guide bar 47, the welder head 51 and the cutting device 50 move transversely of the strip and in alignment with the gap between the frame top walls 13, 18.

It is an important feature of the present invention that the cutting device is self-contained and is of the type which removes small sections in rapid, succession from the material being cut. Such devices are commonly called nibblers and by way of example, the present cutting device is manufactured by the Modern Manufacturing Company, Inc., of Willow Grove, Pa. For an understanding of the present invention, it will be sufficient to state that device 50 consists of a drive motor 54 and a depending cutting head 55 and, as the latter is passed across strip disposed in operable alignment therewith, a section of strip about three sixteenths of an inch wide is removed therefrom in a series of small sections. Since the cutting device 50 is self-contained, no cutting forces are transmitted to the carriage 48; accordingly, the latter and its supporting structure may be made relatively light and inexpensively. As presently disclosed, welding head 51 is of the arc welder type and is a commercially available item marketed under the trademark AIRCO.

Means are provided for reciprocating the carriage 48 along the guide plate 47 and as viewed in FIGS. 1, 4 and 5, flanged pulleys 56 and 57 are rotatably mounted at respective ends of the guide plate 47 and a continuous metal band 58 is trained over the pulleys. Any suitable drive mechanism may be employed for rotating one of the pulleys and, as herein shown, a reversible motor 59 may drive the pulley 57.

With particular reference to FIG. 5, carriage 48 mounts a clamp 60 having a fixed jaw 61 disposed beneath the upper reach of the band 58 and a movable jaw 62 disposed above the band upper reach. A coil spring 63 biases jaw 62 toward jaw 61 to grip the band upper reach therebetween and a cam lever 64 is pivoted to a rod 65 attached to the jaw 62 to provide for selective disengagement of the jaw 62 with the band. Although not shown, facing surfaces of the jaws 61, 62 may carry high friction facings; however, it is to be understood that jaws 61, 62 are designed to slip upon the band under relatively light loading.

OPERATION

With the parts positioned as seen in FIGS. 1, 2, 3, 4, and 5, it will be noted that carriage 48 is positioned at one end of guide plate 47 (such as the left end as seen in full lines in FIG. 4) with the band drive motor 59 de-energized. In this position of parts, strip S may freely travel in the direction indicated and between the side walls of the frame and sub frame, the strip being supported on the rollers 21, 23.

When the trailing end T (FIG. 6) of the strip approaches the apparatus herein disclosed, its travel will be stopped prior to such end reaching the gap between the frame top plates 13, 18 and cylinder 32 will be operated to rock shaft 22 so that blade 27 biases such strip end against the underside of top plate 18. Sub frame 15 will be rocked about its pivot 14 by the cylinder 44 to increase the spacing between the inclined plates 19 by an amount substantially equal to the width of cut of the nibbler 50.

The band drive motor 59 will now be energized to cause the upper reach of the band 58 to travel in the direction from left to right as viewed in FIG. 4 and, since such band is gripped between the clamp jaws 61, 62 (FIG. 5), the carriage 48 will move with the upper reach of the band to traverse the strip. The nibbler 50 will be energized at this time so that when its cutting head is shifted to operable engagement with the strip, the latter will be cut along the lines a—a.

While the band 58 is continuously driven by the motor 59, it is necessary that the nibbler momentarily stop each time its mechanism removes a small section of material from the strip. This is most effectively accomplished by the present mechanism in the following manner: During each short time interval the nibbler is piercing the strip, it is actually locked thereto and the jaws 61, 62 thus slip on the band since their grip thereon is insufficient to maintain the carriage in motion therewith. As soon as the nibbler completes a piercing cycle, movement of the carriage with the band will be resumed until the next piercing cycle of the nibbler commences. Because of the rapidity of the cycles of operation of the nibbler, the carriage and the nibbler mounted thereon will travel across the strip in a series of rapid but short steps.

When the nibbler has traversed the trailing strip end T to the phantom line position seen in FIG. 4, rotation of motor 59 will be reversed to return the carriage to its full line position shown. Substantially simultaneously, the sub frame will be further tilted about its pivot 14 by the cylinder 44 to the position of FIG. 7. A leading strip end L will now be fed past the gap between the frame tops 13, 18 to approximately the position shown and then clamped in position by operation of cylinder 28 to rock shaft 20 and thus urge blade 25 to the position illustrated. Motor 59 will again be energized to cause the carriage and its attached nibbler to traverse the strip L from left to right as viewed in FIG. 4 thus cutting such strip along the lines b—b. During the cutting operations aforesaid, the cut-off free end of the strips, along with the small pieces formed by cutting operation of the nibbler will gravitate down to and will be deflected by the deflector plates 36, 37.

As soon as the nibbler 50 has cut through the leading strip end L and before the welding head 51 has begun to traverse the strip, carriage movement will be momentarily halted while the cylinder 44 returns the sub frame 15 to its original position seen in FIGS. 1, 2 and 8. With the parts thus positioned and as seen in FIG. 8, the severed ends of the trailing and leading strip ends T and L respectively, will be disposed in the abutting relation illustrated. Cylinder 40 will now be actuated to raise the back-up bar 38 beneath the abutted strip ends as seen in FIG. 8, the deflector plates 36, 37 rocking about their pivots to pass the bar and being held apart by respective ears 41.

Traversing movement of carriage 48 in a direction from left to right, as viewed in FIG. 4, will now be initiated once again, it being recalled that the nibbler head 55 is at this time spaced from the right edge of the strip while the welding head 51 is spaced from the left edge thereof. As the welding head 51 traverses the juncture of the strip ends, it will be actuated in any convenient manner to weld such ends together. During the welding operation aforesaid, carriage movement will be smooth and continuous since at this time there will be no forces opposing carriage movement.

When the strip ends have been welded; that is when the welding head 51 has traversed the strip from edge to edge thereof, the carriage will be stopped in its phantom line position of FIG. 4, the cylinder 40 will be actuated to lower the bar 38 to the position of FIG. 2 thus allowing the deflector plates 36, 37 to return to the positions shown. Cylinders 28, 32 will now be actuated to return the blades 25, 27 to the positions seen in FIG. 2 thereby releasing the now continuous strip for a resumption of the longitudinal movement previously disclosed. With the strip unclamped, it will gravitate to the position of FIG.

2 and, since the strip is well below the head of the nibbler 50, the carriage 48 may be returned to its full line position seen in FIG. 4. During such carriage return movement, it may be necessary to shift the sub frame 15 from the position of FIG. 2 to the position of FIG. 6 to avoid interference between the nibbler head 55 and the sub frame plate 19. However, with the carriage in its full line position of FIG. 4, the sub frame will be returned to its initial position of FIG. 2 to await the next strip-joining cycle of operation.

I claim:

1. In the art of joining two pieces of strip in end-to-end relation the improved method which comprises
   clamping respective adjoining ends of the strips to be joined,
   transversely cutting said clamped strip ends by progressively removing small sections in rapid succession therefrom,
   shifting one of said severed strip ends toward the other to establish a predetermined juxtaposed relationship therebetween,
   and traversing said juxtaposed strip ends with a welding device and progressively joining said strip ends together.

2. In apparatus for cutting sheet-like material, the improvement comprising
   clamp means for holding the material to be cut against movement,
   a carriage movable flatwise of the material to be cut,
   a cutting device carried by said carriage and movable therewith from side edge to side edge of the material to be cut and such device being of the type which severs small sections in rapid succession from the material being cut,
   an endless elongated member having a reach extending along the path of travel of said carriage,
   and a slip clutch interposed between said carriage and said endless member reach providing for interruption of carriage movement for short, successive periods during which said cutting device severs a section from the material.

3. The construction of claim 2 wherein said endless elongated member is a metal band.
   and wherein said slip clutch is a clamp carried by said carriage and such clamp gripping said band between opposed friction surfaces.

4. In the art of joining two pieces of strip in end-to-end relation, the improved method which comprises
   clamping one of the strip ends to be joined,
   transversely cutting said clamped strip end by progressively removing small sections in rapid succession therefrom,
   longitudinally shifting said one clamped strip end away from the line of cut,
   clamping another strip end which is to be joined to said one strip end,
   transversely cutting said other clamped strip end by progressively removing small sections in rapid succession therefrom,
   longitudinally shifting said one clamped strip end toward said other clamped strip end to dispose such ends in predetermined juxtaposed relation,
   and traversing said juxtaposed strip ends with a welding device and progressively joining said strip ends together.

5. The construction of claim 2 and further comprising welding means carried by said carriage for movement therewith and traversing the severed edge of the material to weld such material edge to the edge of another piece of material in juxtaposition therewith.

6. The construction of claim 5 wherein clamps are provided for holding each of the pieces of material to be cut, wherein said clamps are disposed on opposite sides of the line of cut of said cutting device, and wherein one of said clamps is shiftable toward the other to dispose the severed material edges in juxtaposition for welding.

7. In the art of joining two pieces of strip in end-to-end relation, the improved method which comprises
   clamping respective adjoining ends of the strips to be joined,
   transversely cutting said clamped strip ends by progressively removing small sections in rapid succession therefrom,
   shifting one of said severed strip ends toward the other to establish a predetermined juxtaposed relationship therebetween,
   and joining said strip ends together.

8. Apparatus for joining the ends of two strips of metal to form a continuous web, comprising frame means having top walls providing spaced confronting edges, spaced rolls carried by said frame means and disposed below said top walls for guiding movement of said web, first means for moving the trailing end of one strip upwardly and to clamp it against one top wall, a nibbler-type cutting device movable along the space between said confronting edges for trimming said trailing end, second means for moving the leading end of the other strip upwardly to clamp it against the other top wall for trimming by subsequent movement of said cutting device, and weld means movable along the space between said confronting edges for welding together the trimmed trailing and leading edges of said strips to form the continuous web.

9. The construction according to claim 8 wherein said first and second means each comprise a blade pivotally mounted on said frame means, and a fluid cylinder for each blade to effect its movement.

10. The construction according to claim 8 wherein said frame means comprises a main frame and a sub-frame pivotally mounted on said main frame, said first means being mounted on said sub-frame and said second means being mounted on said main frame, said sub-frame being movable in one direction to increase the spacing between said confronting edges during trimming of said trailing and leading strip ends and being movable in an opposite direction to position the trimmed strip ends in relation for welding.

11. The construction according to claim 8 wherein said cutting device and said weld means are carried in spaced relation on a carriage which is movable cross-wise of the strip.

12. The construction according to claim 11 wherein an endless band is trained over spaced pulleys, and a slip clutch effects driving connection between said band and said carriage to move the latter.

13. The construction according to claim 12 wherein a reversible motor is utilized to drive said endless band, and means for controlling operation of said motor to effect the following operations in the order named:
   (a) drive said carriage in one direction cross-wise of said one strip so that said cutting device transverses the trailing end to trim the same, said slip clutch permitting movement of said cutting device in successive steps interrupted by short periods of immobility during which said cutting device severs a section from said strip,
   (b) return said carriage,
   (c) again drive said carriage in said one direction cross-wise of said other strip so that said cutting device traverses the leading end to trim the same, said slip cutch again permitting the aforesaid movement of said cutting device,
   (d) continuing movement of said carriage in the direction of operation (c) so that said welding means traverses the trimmed trailing and leading strip ends to weld the same together, and
   (e) moving said first and second blades downwardly sufficiently so that the continuous web formed by the welding operation is supported on said spaced rollers.

14. Apparatus for trimming the end of metal strip, comprising a frame having a top wall and a side wall depending therefrom, a blade pivotally mounted on said side wall and movable toward and away from the undersurface of said top wall, a fluid cylinder for swinging said blade against said top wall undersurface to clamp said strip end therebetween, a nibbler-type cutter movable from side edge to side edge of said strip while said strip is clamped to cut the end of said strip, said frame being pivotally mounted to swing said top wall toward and away from the line of cut.

References Cited
UNITED STATES PATENTS

| | | | |
|---|---|---|---|
| 2,568,961 | 9/1951 | Kipp | 83—916X |
| 2,782,488 | 2/1957 | Anderson | 29—33.21 |
| 2,883,893 | 4/1959 | Bloxham et al. | 29—33.21 |
| 2,888,744 | 6/1959 | Yermish | 83—916X |
| 2,933,588 | 4/1960 | Harper | 29—33.21 |
| 2,143,969 | 1/1939 | Biggert, Jr. | 29—33.214X |

FOREIGN PATENTS

| | | | |
|---|---|---|---|
| 172,382 | 2/1952 | Austria | 83—916 |

WILLIAM S. LAWSON, Primary Examiner

U.S. Cl. X.R.

29—33; 83—56, 916